May 13, 1924.
W. R. COCHRAN
1,493,735
REENFORCING RING FOR AUTOMOBILE TIRES AND METHOD OF MAKING THE SAME
Filed March 13, 1922
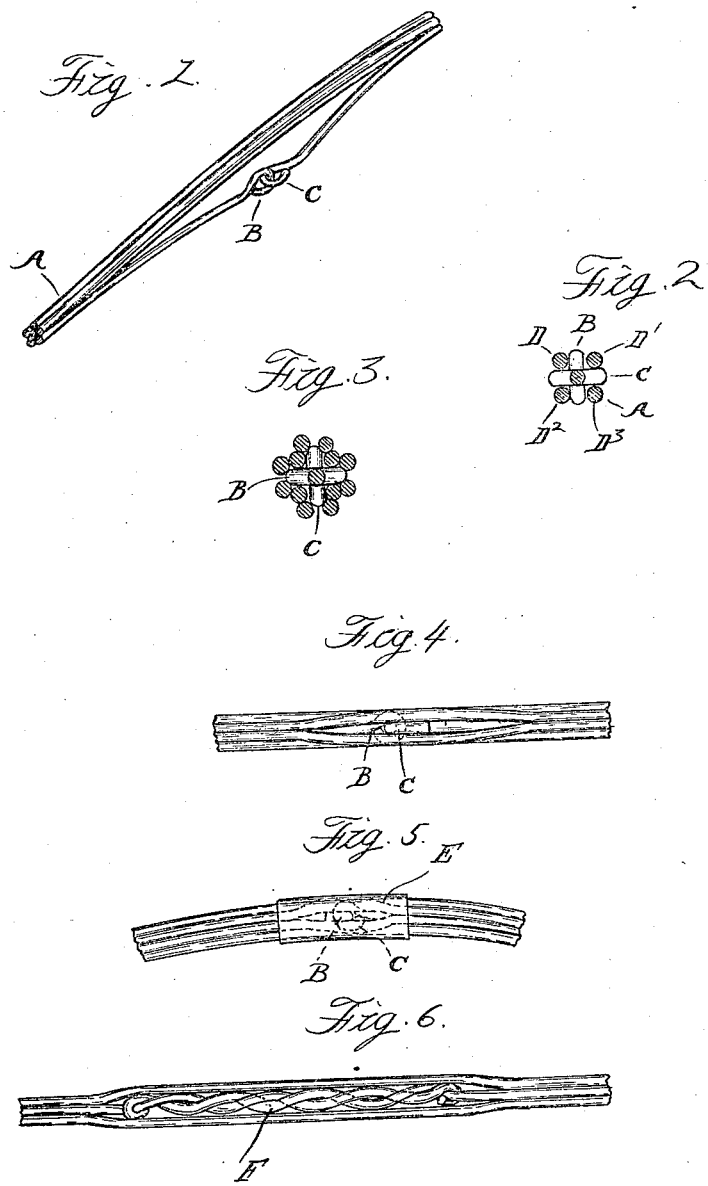
Inventor
William R. Cochran
By Whittemore Hulbert Whittemore
& Belknap
Attorneys Patented May 13, 1924.

1,493,735

UNITED STATES PATENT OFFICE.

WILLIAM R. COCHRAN, OF DETROIT, MICHIGAN, ASSIGNOR, BY DIRECT AND MESNE ASSIGNMENTS, TO WILLIAM E. SOMERVILLE, OF COAL CITY, ILLINOIS.

REENFORCING RING FOR AUTOMOBILE TIRES AND METHOD OF MAKING THE SAME.

Application filed March 13, 1922. Serial No. 543,532.

*To all whom it may concern:*

Be it known that I, WILLIAM R. COCHRAN, a citizen of the United States of America, residing at Detroit, in the county of Wayne and State of Michigan, have invented certain new and useful Improvements in Reenforcing Rings for Automobile Tires and Methods of Making the Same, of which the following is a specification, reference being had therein to the accompanying drawings.

The invention relates to the construction of reenforcing rings such as are employed in the manufacture of automobile tires for the purpose of imparting tensile strength to the beads or rim-engaging portions. In the present state of the art it is usual to form these rings of wire wound in spiral coils, the strands of which are bound together by a fabric wrapping. It is necessary, however, to join the ends of the wire, which is usually accomplished by forming a wire splice between overlapping end portions of the wire, soldering this splice to further secure the same, grinding to smooth the surface, and placing ferrules at the opposite ends of the splice to hold the ends of the wire from breaking loose. The several operations as above given are performed by hand and therefore the labor involved materially adds to the cost of manufacture. Also the soldering of the wire will anneal and soften it so that it loses its resiliency.

It is the object of the present invention to largely eliminate the labor of forming the splice and at the same time to obtain a construction that is superior to that resulting from the usual method. This I accomplish primarily by arranging the joined ends of the wire in the center of the bunch, thereby avoiding the necessity of forming a splice having a smooth outer surface. I also dispense with the overlapping and soldering and join the ends by two simple loops which form a universally flexible joint. Such construction also saves a considerable amount of wire which is necessary in forming a splice of the old type and dispenses with the ferrules and the solder. The invention therefore consists in the construction as more fully hereinafter described.

In the drawings:

Figure 1 is a perspective view of a portion of the reenforcing ring showing the ends as first joined;

Fig. 2 is a cross-section showing the arrangement of the joined wires in relation to the other wires of the bunch;

Fig. 3 is a similar view showing a bunch having a larger number of wires;

Fig. 4 is a plan view of the construction shown in Fig. 2;

Fig. 5 is a side elevation showing the completed joint and temporary wrapping for holding the same in position; and Fig. 6 is a longitudinal plan view showing a modified construction.

The wire from which the ring is formed is first wound in the usual manner to form a bunch A having the required number of strands. The wire is then cut from the reel and the two end portions have formed therein the loops B and C arranged in planes at right angles to each other and interengaging. These loops can be bent without heating the wire thereby avoiding annealing and drawing the temper of any portion. The wires are then manipulated to arrange all of the uninterrupted strands around the joined ends and loops B and C, as indicated in Figs. 2 and 3. It will be noted that in thus arranging the wires, the loops B and C will be held from disengagement by the other strands such as D, D', D², D³, it being only necessary to wrap the bunch to retain the strands permanently in such positions. In the usual process of forming the reinforcement, the wires of the bunch are mechanically wrapped and the same operation may be carried out with my improved construction. However, to guard against any displacement of the strands at the joint prior to the permanent wrapping of the same, I use a temporary wrapping indicated at E in Fig. 5. For this any suitable adhesive tape may be used which will retain the wires in position until in the operation of the wrapping machine they are covered with the permanent wrapping.

The above method of forming the reinforcement will very considerably reduce the cost, as it eliminates a large part of the manual labor and saves material both in the wire ferrules and the solder. It also forms a better construction.

What I claim as my invention is:

1. A reenforcing ring for automobile tires comprising a continuous wire winding forming a plurality of strands, the ends of the wire being looped and engaged with each other and said loops being surrounded by the other strands.

2. A reenforcing ring for automobile tires comprising a continuous wire winding forming a plurality of strands, the ends of the wire being bent into loops arranged in transverse planes and engaging each other, and other strands being arranged in the angles between said loops to retain the same centrally within the bunch.

3. The method of forming reenforcing rings for automobile tires comprising the continuous winding of wire to form a plurality of strands, joining the ends of the wire to each other, arranging the wires to surround the joint with the continuous strands, and temporarily holding the bunch of wires in this relation to be wrapped.

4. The method of forming reenforcing rings for automobile tires comprising the continuous winding of wire to form a ring with a plurality of strands, looping the ends of the wire in engagement with each other, arranging the other strands around said looped wires, and temporarily holding the bunch of wires in this position to be wrapped.

5. The method of forming reenforcing rings for automobile tires comprising the continuous winding of wire to form a ring having a plurality of strands, forming loops in the ends of the wire in engagement with each other and arranged in transverse planes, arranging the other strands in the angles between said loops to thereby surround the joined wires, and temporarily wrapping the joints to retain the wires in this position pending the permanent wrapping of the same.

6. A reenforcing ring for automobile tires comprising a continuous wire winding forming a plurality of strands with the ends of the wire interlocked and surrounded by the other strands.

7. A reenforcing ring for automobile tires comprising a continuous wire winding forming a plurality of strands with the ends of the wire joined to form a universally flexible joint, the said joint being surrounded by the other strands.

In testimony whereof I affix my signature.

WILLIAM R. COCHRAN.